United States Patent
Guo et al.

(10) Patent No.: US 10,878,831 B2
(45) Date of Patent: Dec. 29, 2020

(54) CHARACTERISTIC-BASED SPEECH CODEBOOK SELECTION

(71) Applicant: QUALCOMM Incorporated, San Diego, CA (US)

(72) Inventors: Yinyi Guo, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/405,159

(22) Filed: Jan. 12, 2017

(65) Prior Publication Data

US 2018/0197557 A1    Jul. 12, 2018

(51) Int. Cl.
*G10L 19/22* (2013.01)
*G10L 15/16* (2006.01)
(Continued)

(52) U.S. Cl.
CPC .............. *G10L 19/22* (2013.01); *G10L 15/02* (2013.01); *G10L 15/16* (2013.01); *G10L 19/00* (2013.01); *G10L 25/63* (2013.01); *G10L 25/30* (2013.01); *G10L 25/51* (2013.01); *G10L 2019/0001* (2013.01)

(58) Field of Classification Search
CPC ......... G10L 15/20; G10L 25/30; G10L 15/06; G10L 15/02; G10L 15/16; G10L 19/00; G10L 19/22; G10L 2019/0001; G10L 25/51; G10L 25/63

See application file for complete search history.

(56) References Cited

U.S. PATENT DOCUMENTS

| 5,008,941 A | * | 4/1991 | Sejnoha | ................. G10L 15/07 704/222 |
| 5,950,155 A | * | 9/1999 | Nishiguchi | ............ G10L 19/07 704/230 |

(Continued)

FOREIGN PATENT DOCUMENTS

| CN | 105761720 A | 7/2016 |
| EP | 1052620 A1 | 11/2000 |
| WO | 2015199813 A1 | 12/2015 |

OTHER PUBLICATIONS

D. H. Rao Naidu and S. Srinivasan, "Speech Enhancement Using Emotion-Dependent Codebooks," IWAENC 2012; International Workshop on Acoustic Signal Enhancement, Aachen, Germany, 2012, pp. 1-4. (Year: 2012).*

(Continued)

*Primary Examiner* — Angela A Armstrong
(74) *Attorney, Agent, or Firm* — Moore Intellectual Property Law, PLLC

(57) ABSTRACT

An apparatus includes a speech processing engine configured to receive data corresponding to speech and to determine whether a first characteristic associated with the speech differs from a reference characteristic by at least a threshold amount. The apparatus further includes a selection circuit responsive to the speech processing engine. The selection circuit is configured to select a particular speech codebook from among a plurality of speech codebooks based on the first characteristic differing from the reference characteristic by at least the threshold amount. The particular speech codebook is associated with the first characteristic.

30 Claims, 7 Drawing Sheets

(51) Int. Cl.
*G10L 15/02* (2006.01)
*G10L 25/63* (2013.01)
*G10L 19/00* (2013.01)
 G10L 25/51 (2013.01)
 G10L 25/30 (2013.01)

(56) References Cited

U.S. PATENT DOCUMENTS

| | | | |
|---|---|---|---|
| 6,804,639 B1* | 10/2004 | Ehara | G10L 19/08 704/207 |
| 6,901,365 B2* | 5/2005 | Miyazawa | G10L 15/144 704/236 |
| 8,346,551 B2 | 1/2013 | Herbig et al. | |
| 8,600,739 B2 | 12/2013 | Zhang et al. | |
| 8,700,396 B1 | 4/2014 | Mengibar et al. | |
| 2002/0143527 A1* | 10/2002 | Gao | G10L 19/265 704/223 |
| 2004/0243404 A1* | 12/2004 | Cezanne | G10L 21/0364 704/225 |
| 2005/0010402 A1 | 1/2005 | Sung et al. | |
| 2007/0055502 A1* | 3/2007 | Preuss | G10L 19/20 704/219 |
| 2008/0319741 A1 | 12/2008 | Gilbert | |
| 2010/0014510 A1* | 1/2010 | Boreli | H04L 29/06027 370/352 |
| 2010/0088088 A1* | 4/2010 | Bollano | G10L 15/065 704/201 |
| 2010/0138222 A1* | 6/2010 | Herbig | G10L 15/065 704/243 |
| 2011/0077944 A1* | 3/2011 | Seshadri | G10L 15/005 704/257 |
| 2013/0173259 A1* | 7/2013 | Mittal | G10L 19/0212 704/201 |
| 2015/0161994 A1 | 6/2015 | Tang et al. | |
| 2015/0172831 A1* | 6/2015 | Dittberner | H04R 25/70 381/314 |
| 2016/0019884 A1* | 1/2016 | Xiao | G10L 15/063 704/232 |
| 2016/0198474 A1* | 7/2016 | Raghavan | H04B 7/0874 370/335 |
| 2017/0195491 A1* | 7/2017 | Odinak | H04M 3/5175 |
| 2017/0206915 A1* | 7/2017 | Prasad | G10L 25/93 |

OTHER PUBLICATIONS

Singh K., "Speech Recognition: A Review of Literature", International Journal of Engineering Trends and Technology (IJETT), Jul. 2016, vol. 37, No. 6, pp. 302-310.
International Search Report and Written Opinion—PCT/US2017/063438—ISA/EPO—dated Feb. 15, 2018.

* cited by examiner

CHARACTERISTIC-BASED SPEECH CODEBOOK SELECTION

I. FIELD

This disclosure is generally related to electronic devices and more particularly to processing of audio signals by electronic devices.

II. DESCRIPTION OF RELATED ART

An electronic device (e.g., a mobile device or a server) may receive data based on speech of a user. For example, the data may include samples of the speech.

The electronic device may use the data in connection with one or more speech-based operations. To illustrate, the electronic device may recognize a command, such as "navigate home," within the speech based on the data. As another example, the electronic device may recognize an identity of the user, such as by matching a frequency spectrum of the data to information associated with the user.

In some cases, a speech-based operation may incur latency and excess power consumption. For example, background noise may inhibit an electronic device from recognizing a command, resulting in latency and excess power consumption as the electronic device reattempts to recognize the command. In some cases, a user may be prompted to speak the command again or to enter the command using a graphical user interface.

III. SUMMARY

In an illustrative example, an apparatus includes a speech processing engine configured to receive data corresponding to speech. The speech processing engine is further configured to determine whether a first characteristic associated with the speech differs from a reference characteristic by at least a threshold amount. The apparatus further includes a selection circuit responsive to the speech processing engine. The selection circuit is configured to select a particular speech codebook from among a plurality of speech codebooks based on the first characteristic differing from the reference characteristic by at least the threshold amount. The particular speech codebook is associated with the first characteristic.

In another illustrative example, a method of selecting a speech codebook includes receiving data corresponding to speech. The method further includes selecting, based on a first characteristic associated with the speech differing from a reference characteristic by at least a threshold amount, a particular speech codebook from among a plurality of speech codebooks. The particular speech codebook is associated with the first characteristic.

In another illustrative example, an apparatus includes means for receiving data corresponding to speech and for determining whether a first characteristic associated with the speech differs from a reference characteristic by at least a threshold amount. The apparatus further includes means for selecting a particular speech codebook from among a plurality of speech codebooks based on the first characteristic differing from the reference characteristic by at least the threshold amount. The particular speech codebook is associated with the first characteristic.

In another illustrative example, a computer-readable medium stores instructions that, when executed by a processor, cause the processor to perform operations. The operations include receiving data corresponding to speech. The operations further include selecting a particular speech codebook from among a plurality of speech codebooks based on a first characteristic associated with the speech differing from a reference characteristic by at least a threshold amount. The particular speech codebook is associated with the first characteristic.

IV. BRIEF DESCRIPTION OF THE DRAWINGS

V. DETAILED DESCRIPTION

Aspects of the disclosure are related to speech-based operations (e.g., speaker recognition or voice recognition) that are performed based on one or more detected characteristics of speech. To illustrate, one or more processing operations may be "customized" based on characteristics such as an emotion indicated by the speech, an estimated age of a speaker, a speaking style of the speaker, or an estimated distance from the speaker to a microphone, as illustrative examples. In a particular example, a particular speech codebook is selected based on one or more characteristics of the speech, and the speech is encoded or decoded using the particular speech codebook (e.g., to "customize" encoding or decoding according to particular characteristics of the speech).

A characteristic associated with speech may be detected by determining a difference between the speech and a reference characteristic, such as an "average" or "normal" speech characteristic. In an illustrative implementation, a deep neural network (DNN) model includes a set of input nodes and a set of output nodes. Each output node may correspond to a speech characteristic. For each output node, the DNN model may assign a classification probability to the speech, where the classification probability indicates a likelihood that the speech has the particular characteristic. A speech characteristic may be determined based on the classification probability. Other illustrative aspects are described below with reference to the drawings.

Figure 1:
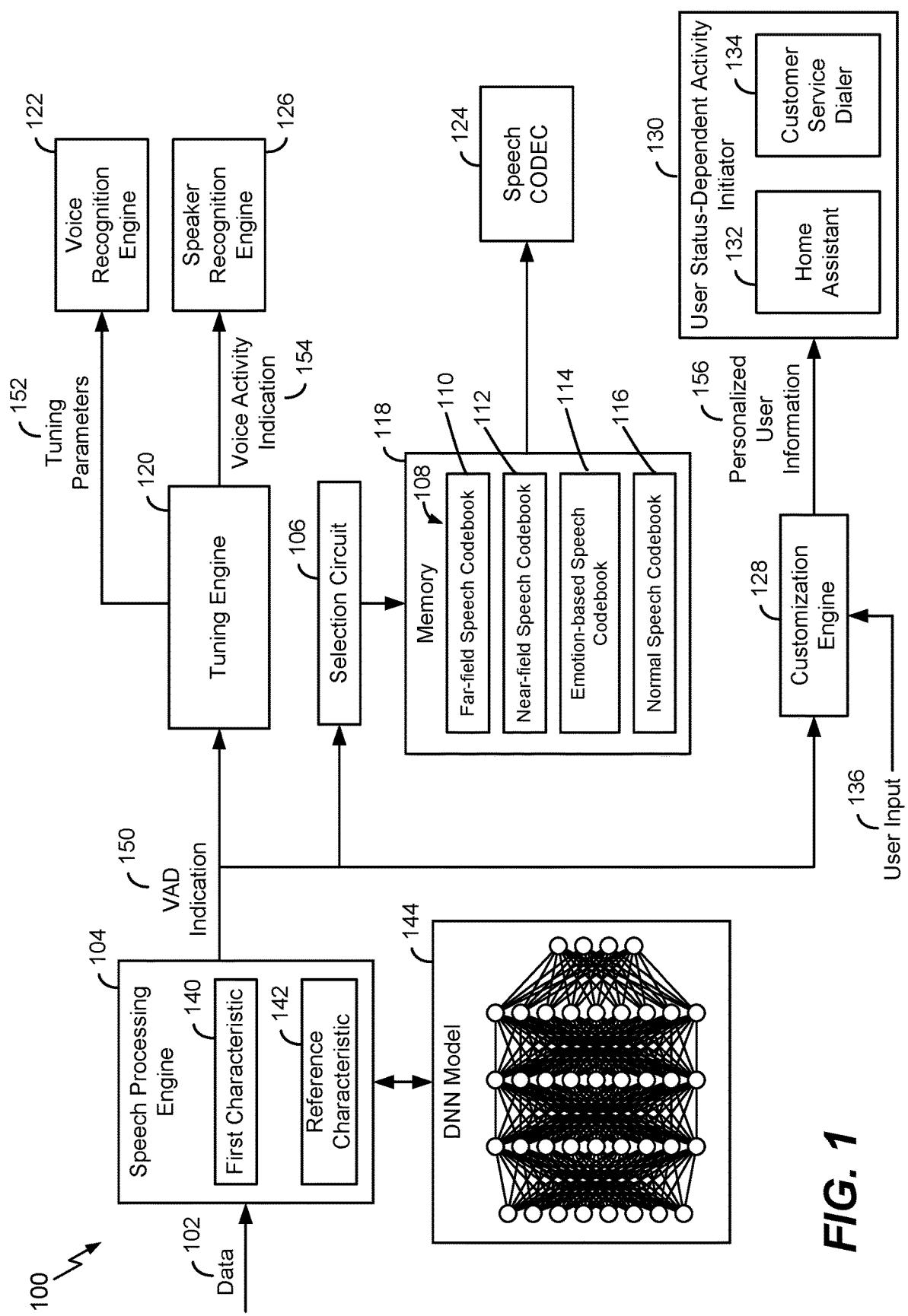
FIG. 1 is a diagram of an illustrative example of a device that includes a speech processing engine and a selection circuit.

Referring to FIG. 1, a device is depicted and generally designated 100. In some implementations, aspects of the device 100 may be implemented within a mobile device, as described further with reference to FIG. 6. Alternatively or in addition, aspects of the device 100 may be implemented within a base station, as described further with reference to FIG. 7. Alternatively or in addition, aspects of the device 100 may be implemented within another device, such as a server, as an illustrative example.

The device 100 includes a speech processing engine 104. In an illustrative example, the speech processing engine 104 is coupled to one or more microphones or is configured to receive data 102 that represents one or more acoustic signals, such as one or more speech signals. For example, the data 102 may correspond to speech of a user.

The device 100 further includes a selection circuit 106. The selection circuit 106 may be coupled to the speech processing engine 104. The selection circuit 106 may include a multiplexer (MUX) circuit, as an illustrative example.

The device 100 may further include a memory 118. Depending on the particular implementation, the memory 118 may include a volatile memory, a non-volatile memory, or a combination thereof. The memory 118 may be configured to store a plurality of speech codebooks 108. For example, the plurality of speech codebooks 108 may include at least one of a far-field speech codebook 110, a near-field speech codebook 112, an emotion-based speech codebook 114 (e.g., an "angry" speech codebook), or a normal speech codebook 116 (e.g., a "default" speech codebook). As used herein, a "speech codebook" may refer to information (e.g., a data structure) that indicates, for each data input of a set of data inputs, one or more data outputs in connection with a coding operation, such as an encoding operation, a decoding operation, or both.

The device 100 may further include a speech coder/decoder (CODEC) 124. The speech CODEC 124 may be coupled to the memory 118. For example, the speech CODEC 124 may be configured to receive one or more speech codebooks from the memory 118. The speech CODEC 124 may be configured to receive the data 102 (e.g., data representing speech input to the device 100).

The device 100 may further include one or more of a tuning engine 120, a voice recognition engine 122, or a speaker recognition engine 126. The tuning engine 120 may be responsive to the speech processing engine 104 and may be coupled to the voice recognition engine 122 and the speaker recognition engine 126.

The device 100 may further include one or more of a customization engine 128 or a user status-dependent activity initiator 130. The customization engine 128 may be coupled to the speech processing engine 104 and to the user status-dependent activity initiator 130. In the illustrative example of FIG. 1, the user status-dependent activity initiator 130 includes a home assistant 132 and a customer service dialer 134.

During operation, the speech processing engine 104 receives the data 102. The speech processing engine 104 may be configured to identify at least a first characteristic 140 of speech corresponding to the data 102. In a particular example, the speech processing engine 104 is configured to identify the first characteristic 140 using a deep neural network (DNN) model 144. For example, the DNN model 144 may include a set of input nodes, a set of output nodes, and a set of hidden nodes. Each output node may correspond to a speech characteristic. For each output node, the DNN model 144 may assign a classification probability to the speech, where the classification probability indicates a likelihood that the speech has the particular characteristic. The first characteristic 140 may be determined based on the classification probability. The DNN model 144 may classify the speech based on one or more of a noise characteristic or a frequency spectrum associated with the data 102.

Depending on the particular example, the data 102 may include encoded data or decoded data, and the first characteristic 140 may be detected using the encoded data or decoded data. For example, in some implementations, the reference characteristic 142 may correspond to an encoded representation of a characteristic, and the speech processing engine 104 may compare encoded data of the data 102 to the encoded representation of the characteristic. As another example, in some implementations, the reference characteristic 142 may correspond to a decoded (or un-encoded) representation of a characteristic, and the speech processing engine 104 may compare decoded (or un-encoded) data of the data 102 to the decoded representation of the characteristic.

The first characteristic 140 may correspond to or may be based on a qualitative characteristic associated with the speech based on the data 102. For example, the first characteristic 140 may be based on an emotion of a user, an environment (e.g., a type of building, a particular room of a building, or a vehicle) of the user, an estimated age of the user, a gender of the user, or an estimated distance of a microphone from the user, as illustrative examples. To illustrate, the first characteristic 140 may correspond to a value (or a set of values) that indicates whether a particular emotion is detected in the speech or an amount of a particular emotion detected in the speech. In some examples, the first characteristic 140 may correspond to a set of multiple values, where each value of the set is associated with a corresponding feature of the speech. In some examples, the set of values may correspond to a vector or a bitmap (e.g., a bitmap where each bit corresponds to a probability of a particular characteristic). As an illustrative example, a first bit may indicate whether a particular emotion is detected in the speech, and a second bit may indicate whether near-field speech is detected in the data 102. The speech processing engine 104 may be configured to identify the first characteristic 140 using a frequency spectrum of the data 102, as an illustrative example (e.g., by using voice reverberation or ambient sounds to determine that the user is inside a building, to determine whether the building includes a particular type of material, such as brick or wood, to determine a dimension of the building, or to determine whether the building corresponds to a home or an office). In some cases, location information (e.g., global positioning system (GPS) information) may be input to the speech processing engine 104 to enable determination of the first characteristic 140 (e.g., to identify room of a building, as an illustrative example). Alternatively or in addition, the speech processing engine 104 may be configured to identify the first characteristic 140 by determining an amount of distortion in the speech (which may indicate an emotion, such as anger).

The speech processing engine 104 is configured to determine whether the first characteristic 140 differs from a reference characteristic 142 by at least a threshold amount. For example, the speech processing engine 104 may be configured to compare the first characteristic 140 and the reference characteristic 142 to determine a first parameter and to compare the first parameter to a second parameter that corresponds to the threshold amount. In a particular example, the reference characteristic 142 corresponds to a "normal" (or "default") set of parameters associated with "normal" speech. To further illustrate, in some cases, the first characteristic 140 may differ from the reference characteristic 142 by at least the threshold amount due to distortion present in speech corresponding to the data 102. In some implementations, the reference characteristic 142 may correspond to a mask of bits (e.g., a set of expected values associated with "normal" speech), and the first characteristic 140 may differ from the reference characteristic 142 if one or more values of the first characteristic 140 are not contained in the mask.

In some implementations, the speech processing engine 104 is configured to compare the first characteristic 140 to the reference characteristic 142 using the DNN model 144. For example, the reference characteristic 142 may correspond to a first output node of the DNN model 144. The speech processing engine 104 may be configured to determine a number of output nodes separating the first output node and a second output node associated with the first characteristic 140 (e.g., a "distance" between the first characteristic 140 and the reference characteristic 142) to determine whether the first characteristic 140 differs from a reference characteristic 142 by at least a threshold amount.

The speech processing engine 104 may be configured to generate an indication of one or more characteristics (e.g., the first characteristic 140) of the data 102. For example, the speech processing engine 104 may generate a voice activity detector (VAD) indication 150. The VAD indication 150 may indicate the first characteristic 140. For example, the VAD indication 150 may indicate one or more of an emotion of a user, an environment (e.g., a type of building, a particular room of a building, or a vehicle) of the user, an estimated age of the user, a gender of the user, or an estimated distance of a microphone from the user, as illustrative examples.

The selection circuit 106 is responsive to the speech processing engine 104. For example, the selection circuit 106 may be configured to receive the VAD indication 150. The selection circuit 106 may be configured to select a particular speech codebook of the plurality of speech codebooks 108 based on the first characteristic 140 indicated by the VAD indication 150. For example, the selection circuit 106 may "match" the first characteristic 140 to one or more characteristics associated with the particular speech codebook. Each speech codebook of the plurality of speech codebooks 108 is associated with a particular set of one or more speech characteristics. To further illustrate, each speech codebook of the plurality of speech codebooks 108 may be associated with a corresponding set of values (e.g., a vector or a bitmap), and the VAD indication 150 may include a set of values (e.g., a vector or a bitmap) corresponding to the first characteristic 140. In this example, the selection circuit 106 may "match" values of the VAD indication 150 to values associated with the particular speech codebook.

The selection circuit 106 is configured to select the particular speech codebook based on the first characteristic 140 differing from the reference characteristic 142 by at least a threshold amount. In this case, the selection circuit 106 may "match" the first characteristic 140 to the particular speech codebook, such as the far-field speech codebook 110, the near-field speech codebook 112, or the emotion-based speech codebook 114. To further illustrate, the selection circuit 106 may be configured to select the particular speech codebook in response to at least one value indicated by the first characteristic 140 corresponding to the particular speech codebook. As an illustrative example, a particular value (or a set of values) associated with the first characteristic 140 may indicate whether far-field speech or near-field speech is detected in the data 102, and the selection circuit 106 may be configured to select the far-field speech codebook 110 or the near-field speech codebook 112 based on the particular value (or set of values). Alternatively, the selection circuit 106 may select the normal speech codebook 116, such as if the first characteristic 140 does not differ from the reference characteristic 142 by at least the threshold amount.

To further illustrate, in a particular example, the selection circuit 106 is configured to select the particular speech codebook based on a comparison of the first characteristic 140 and the reference characteristic 142. For example, the reference characteristic 142 may correspond to a near-field characteristic. In this case, if the first characteristic 140 differs from the reference characteristic 142, the selection circuit 106 may be configured select a far-field codebook of the plurality of speech codebooks 108.

In some implementations, the selection circuit 106 is configured to select the particular speech codebook based on an amount of difference between the first characteristic 140 and the reference characteristic 142. As an illustrative example, the reference characteristic 142 may correspond to a "default" speaking distance, and the first characteristic 140 may be associated with a value that indicates a magnitude of an estimated speaking distance associated with speech indicated by the data 102. The value may also have a sign (e.g., positive or negative) that indicates whether the estimated speaking distance is less than the default speaking distance (e.g., a positive sign) or more than the default speaking distance (e.g., a negative sign). The plurality of speech codebooks 108 may include multiple near-field speech codebooks associated with different speaking distances and multiple far-field speech codebooks associated with different speaking distances. The selection circuit 106 may be configured to select one of the multiple near-field speech codebooks or one of the multiple far-field speech codebooks based on an amount of difference between the first characteristic 140 and the reference characteristic 142.

The speech CODEC 124 is configured to receive the data 102 and the particular speech codebook and to perform at least one speech-based operation based on the data 102 using the particular speech codebook. For example, the speech CODEC 124 may be configured to encode the data 102 using the particular speech codebook. As another example, the speech CODEC 124 may be configured to decode the data 102 using the particular speech codebook.

Alternatively or in addition to performing a speech-based operation at the speech CODEC 124, the device 100 may perform one or more other speech based operations based on the first characteristic 140. For example, the tuning engine 120 may generate tuning parameters 152 and a voice activity indication 154 based on the data 102 and the VAD indication 150. The tuning engine 120 may perform one or more of a signal-to-noise ratio (SNR) tuning operation, a tuning threshold reduction operation, or another operation to generate the tuning parameters 152 and the voice activity indication 154. The voice recognition engine 122 may perform a voice recognition operation based on the tuning parameters 152, and the speaker recognition engine 126 may perform a speaker recognition operation based on the voice activity indication 154 to detect a source of the speech corresponding to the data 102. In some examples, an operation may be performed based on one or more of a recognized speaker or a recognized source associated with speech indicated by the data 102. For example, one or more of a music recommendation, a service recommendation, a product recommendation, or a commercial may be provided based on the recognized speaker or the recognized source, as described further with reference to FIG. 2.

In some implementations, the customization engine 128 may generate personalized user information 156 based on the VAD indication 150 and further based on user input 136 indicating one or more attributes of a user. The personalized user information 156 may include information that identifies a user, such as a name, identity, location, or other information associated with a user, as illustrative examples. The user input 136 may be received via a user interface, such as a graphical user interface (GUI) as an illustrative example.

The user input 136 may indicate a name, identity, location, or other information associated with a user (e.g., a speaker corresponding to the data 102).

The user status-dependent activity initiator 130 may be configured to perform one or more operations based on the personalized user information 156 and the data 102. For example, the home assistant 132 may perform a home automation operation based on the personalized user information 156. As another example, the customer service dialer 134 may dial a phone number (e.g., a customer service number) based on the personalized user information 156. As an illustrative example, if the first characteristic 140 indicates anger, and the user input 136 indicates to play music, the home assistant 132 may select soothing music for playback.

The example of FIG. 1 illustrates that performing certain speech-based operations based on the first characteristic 140 may improve operation of the device 100. For example, a speech encoding operation or a speech decoding operation performed by the speech CODEC 124 may use a particular speech codebook of the plurality of speech codebooks 108 that corresponds to the first characteristic 140. Use of a particular speech codebook based on the first characteristic 140 may improve encoding or decoding operation by the speech CODEC 124.

Figure 2:
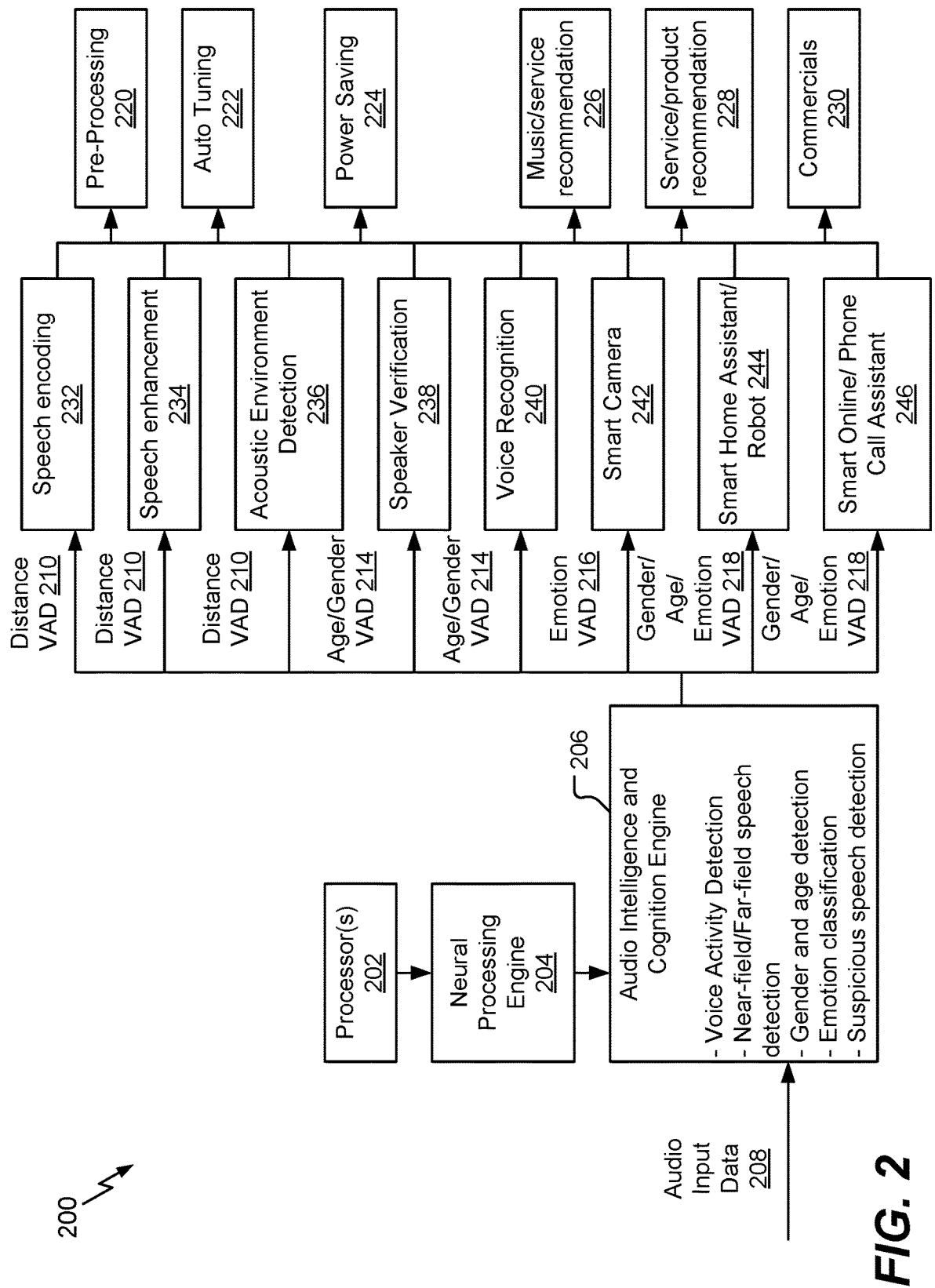
FIG. 2 is a diagram illustrating examples of operations of a system, such as a system that includes the device of FIG. 1.

Referring to FIG. 2, illustrative aspects of a system are depicted and generally designated 200. FIG. 2 illustrates certain operations that may be initiated, controlled, or performed using one or more processors 202, a neural processing engine 204, and an audio intelligence and cognition engine 206.

The audio intelligence and cognition engine 206 is configured to receive audio input data 208. In some implementations, the audio intelligence and cognition engine 206 corresponds to the speech processing engine 104 of FIG. 1, and the audio input data 208 corresponds to the data 102 of FIG. 1. The audio intelligence and cognition engine 206 may be configured to perform one or more operations based on the audio input data 208. For example, the audio intelligence and cognition engine 206 may be configured to perform one or more of voice activity detection, near-field speech detection, far-field speech detection, gender and age detection, emotion classification, suspicious speech detection, or other operations. The audio intelligence and cognition engine 206 may receive input (e.g., control signals) from one or more of the neural processing engine 204 or the one or more processors 202. For example, the audio intelligence and cognition engine 206 may receive the DNN model 144 of FIG. 1 from one or more of the neural processing engine 204 or the one or more processors 202

The audio intelligence and cognition engine 206 may be configured to generate one or more VAD indications, such as the VAD indication 150 of FIG. 1. To further illustrate, the audio intelligence and cognition engine 206 may be configured to generate one or more of a distance VAD indication 210, an age and gender VAD indication 214, and emotion VAD indication 216, or a gender, age, and emotion VAD indication 218.

The audio intelligence and cognition engine 206 may be configured to perform one or more operations based on one or more VAD indications generated by the audio intelligence and cognition engine 206. To illustrate, in the example of FIG. 2, the system 200 may perform one or more of a speech encoding operation 232, a speech enhancement operation 234, an acoustic environment detection operation 236, a speaker verification operation 238, a voice recognition 240 operation, a smart camera operation 242, a smart home device operation 244 (e.g., a home assistant operation or a home robot operation), a smart online/phone call assistant operation 246, or one or more other operations. FIG. 2 additionally illustrates that the system 200 may perform a preprocessing operation 220, an auto-tuning operation 222, a power saving operation 224, a recommendation operation 226 (e.g., a music or service recommendation), a service/product recommendation 228, or a commercial operation 230.

In some implementations, performing the operations 234, 236, and 240 may include selecting a particular "tuning set" from a set of tuning sets based on one or more of the VAD indications 210, 214, 216, and 218. For example, performing the operations 234, 236, and 240 may include selecting one or more of a voice segment tuning set, a noise segment tuning set, a 1 meter (m) tuning set, a near-field tuning set, a 5 m tuning set, or another tuning set. In this case, auto-tuning may be achieved using one or more of the VAD indications 210, 214, 216, and 218 and by selecting one or more tuning sets based on the particular scenario. The tuning sets may correspond to the plurality of speech codebooks 108 of FIG. 1.

In some examples, the preprocessing operation 220 is performed in connection with the acoustic environment detection operation 236. For example, performing the preprocessing operation 220 may include reducing a near-field voice segment from the audio input data 208 prior to completion of the acoustic environment detection operation 236 (e.g., for privacy, to increase robustness of the acoustic environment detection operation 236, or both).

In some implementations, the power saving operation 224 may include selectively activating or deactivating one or more features based on one or more of the VAD indications 210, 214, 216, and 218. For example, upon recognizing a voice using the voice recognition operation 240, a particular feature may be activated or deactivated. In a particular example, an automobile, a mobile device, or an Internet-of-Things (IoT) device may be in a deactivated state until a voice is recognized using the voice recognition operation 240. The device may be activated in response to recognizing the voice using the voice recognition operation 240.

Performing the smart camera operation 242 may include selectively activating or deactivating a camera application (e.g., of a mobile device) based on one or more of the VAD indications 210, 214, 216, and 218. For example, an Internet Protocol (IP) camera may be activated in response to detecting an emotion, such as screaming, shouting, or crying.

In a particular example, performing the smart home device operation 244 may include generating the recommendation 226 based on the gender, age, and emotion VAD indication 218. For example, if emotional speech is detected, corresponding services (e.g., soothing music) may be offered via the recommendation 226. Alternatively or in addition, the smart online/phone call assistant operation 246 may be performed based on the gender, age, and emotion VAD indication 218, such as by generating the commercials 230. As an illustrative example, a commercial may be tailored to a particular customer on hold during a phone call, such as based on an age of the customer.

Figure 3:
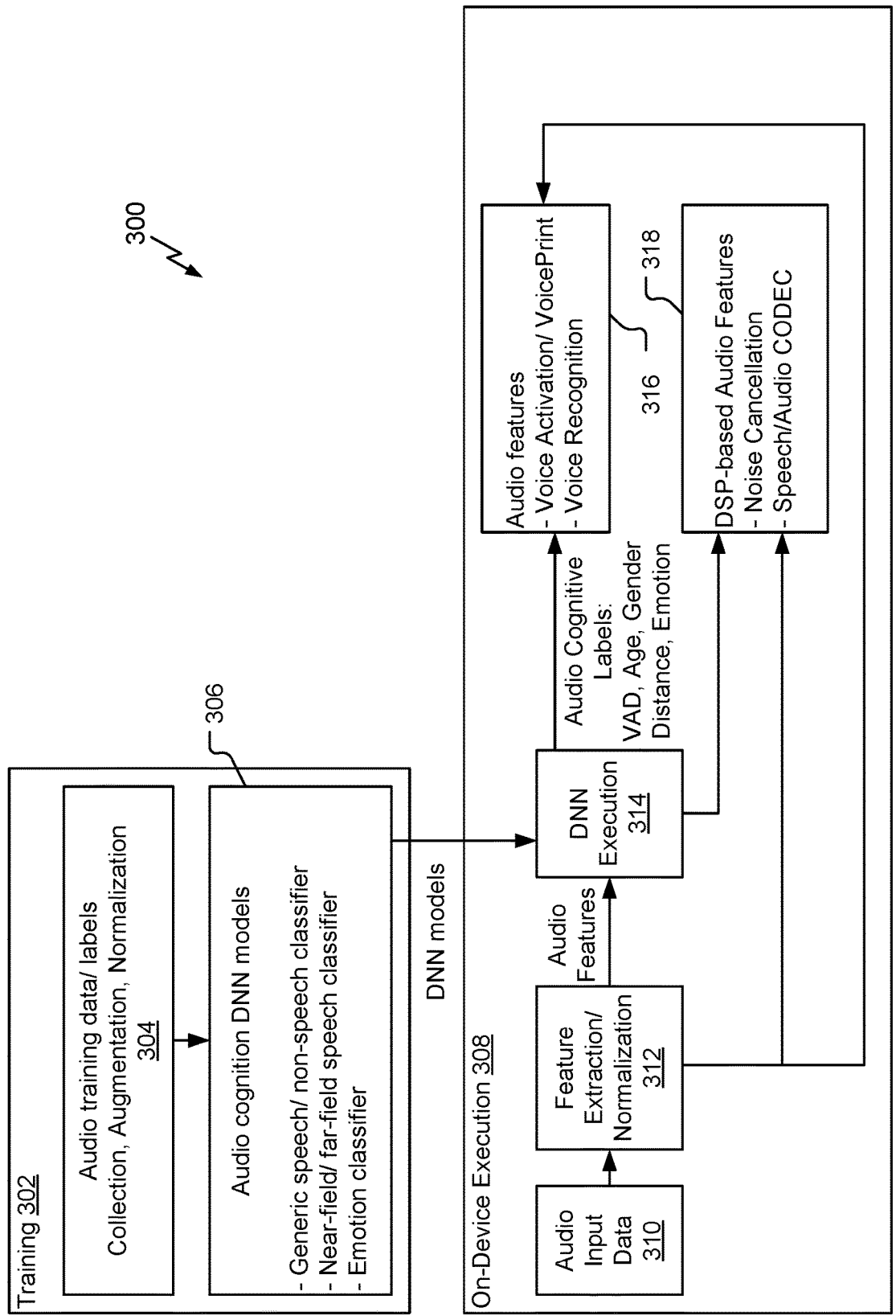
FIG. 3 is a diagram illustrating operations of a process that may be performed using the device of FIG. 1.

Referring to FIG. 3, illustrative aspects of a process are depicted and generally designated 300. The process 300 of FIG. 3 may include one or more training operations 302 (e.g., off line training operations). FIG. 3 also illustrates that the process 300 may include one or more on-device execution operations 308.

The training operations 302 may include a first set of operations 304. The first set of operations 304 may include audio training, labeling, collection, augmentation, normalization, one or more other operations, or a combination thereof. FIG. 3 also depicts a second set of operations 306 that may train audio cognition and DNN models based on one or more results of the first set of operations 304. The second set of operations 306 may include generic speech and non-speech classification, near-field speech classification, far-field speech classification, emotion classification, one or more other operations, or a combination thereof.

The on-device execution operations 308 may include receiving audio input data, at 310. For example, the data 102 of FIG. 1 or the audio input data 208 of FIG. 2 may be received. The on-device execution operations 308 may further include feature extraction and normalization, at 312. For example, the feature extraction may include generating data representing the audio input data, such as a histogram of a frequency representation of samples of the input audio data, as an illustrative example.

FIG. 3 also depicts DNN execution, at 314. For example, during the DNN execution, the speech processing engine 104 of FIG. 1 may use the DNN model 144 of FIG. 1 to recognize one or more characteristics based on features extracted from the input audio data. The DNN execution may include determining the first characteristic 140 of FIG. 1, such as using the reference characteristic 142. Further, the DNN execution may be performed in accordance with one or more aspects of the training operations 302, such as using one or more DNN models determined during the training operations 302. The DNN execution may result in one or more audio cognitive labels, such as age, gender, distance, or emotion labels, which may correspond to the first characteristic 140 of FIG. 1. The on-device execution operations 308 may further include one or more audio feature operations 316, such as a voice activation operation, a voice print operation (e.g., to convert speech to text), or a voice recognition operation. The on-device execution operations 308 may further include one or more digital signal processor (DSP) based audio feature operations 318 using a DSP, such as by performing noise cancelation or speech or audio encoding or decoding.

Figure 4:
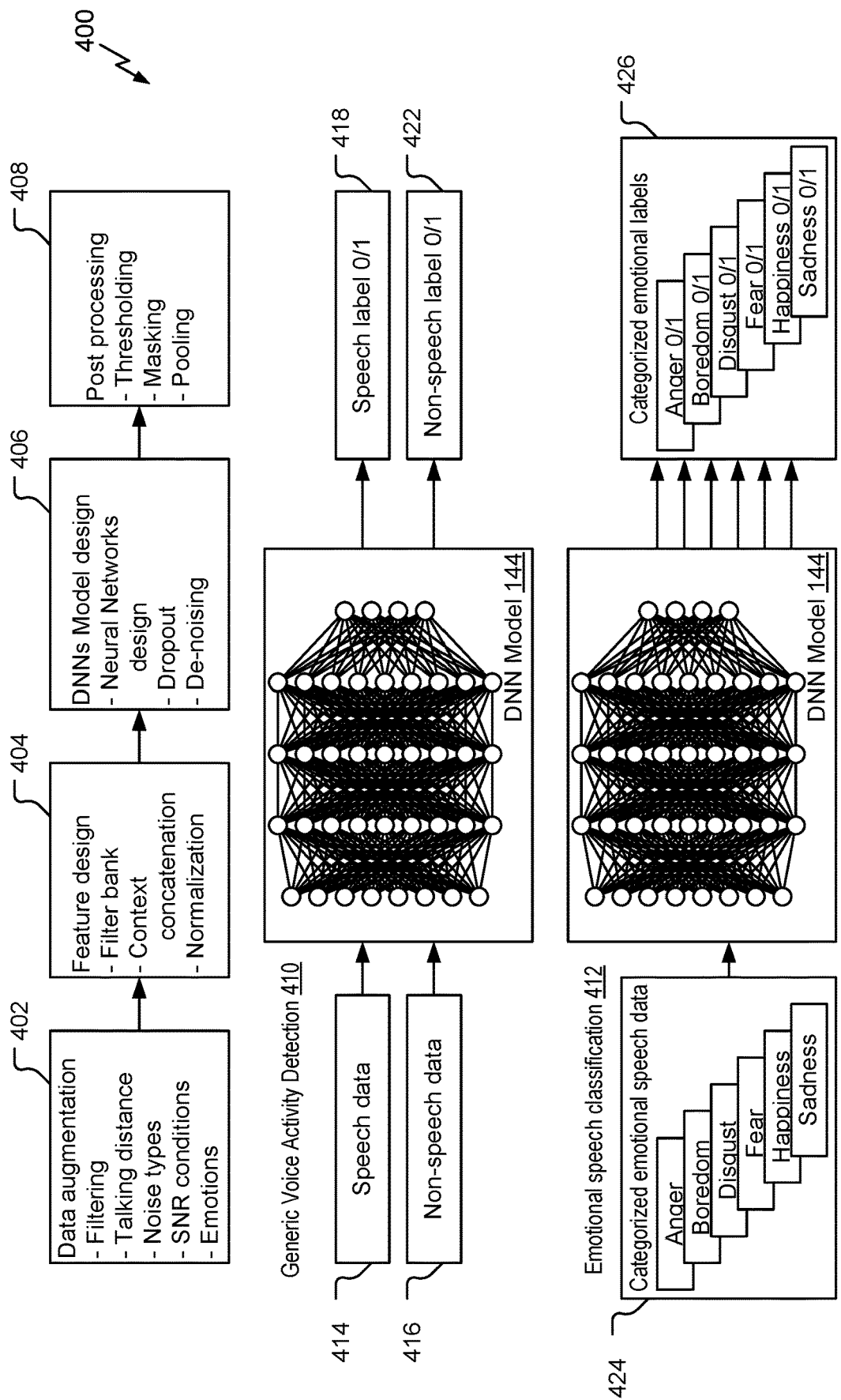
FIG. 4 is a diagram illustrating operations of a training scheme.

Referring to FIG. 4, illustrative aspects of a DNN training scheme are depicted and generally designated 400. The DNN training scheme 400 may be applied in connection with one or more DNN models, such as the DNN model 144 of FIG. 1.

The DNN training scheme 400 includes data augmentation, at 402. For example, the data augmentation may include one or more of filtering, determining a talking distance, determining a noise type, determining an SNR condition, or determining an emotion. To illustrate, reference data indicating a reference speech pattern may be associated with a particular emotion and a particular talking distance, and the reference data may be analyzed to determine the reference characteristic 142 of FIG. 1.

The DNN training scheme 400 may further include feature design, at 404. For example, the feature design may include generating a filter bank, performing context concatenation, or performing normalization. The feature design may be performed using mel-frequency cepstral coefficients (MFCCs) and a log-mel-band spectrum associated with one or more of the speech data 414 or the non-speech data 416. Features of multiple frames of the data 414, 416 may be combined (e.g., concatenated) and used during the feature design. Further, input features of the data 414, 416 may be normalized using features of multiple frames, such as using a global mean, a global variance, or both.

The DNN training scheme 400 may further include designing a DNN model, at 406, such as by generating the DNN model 144 of FIG. 1. Designing the DNN model may include designing neural networks, performing a dropout operation, or performing a de-noising operation. In a particular example, designing the DNN model includes performing dropout and de-noising operations for generalization of the DNN model. The DNN model may have a feed-forward, fully-connected configuration.

The DNN training scheme 400 may further include post-processing, at 408. The post-processing may include one or more of a thresholding operation, a masking operation, or a pooling operation. The thresholding operation may include determining output probabilities of the DNN model. For example, if a probability of an output (e.g., a speech label 418) corresponding to speech (or a particular speech characteristic) satisfies a threshold, then a determination is made that speech (or a particular speech characteristic) is detected.

The DNN training scheme 400 may further include generic voice activity detection, at 410. For example, speech data 414 may be input to the DNN model 144 to generate the speech label 418, and non-speech data 416 may be input to the DNN model 144 to generate a non-speech label 422. The speech label 418 and the non-speech label 422 may correspond to nodes of the DNN model 144. For example, the speech label 418 may correspond to an output node of the DNN model 144 corresponding to "default" (or "normal") speech, and the non-speech label 422 may correspond to a non-speech (e.g., noise) output node of the DNN model 144.

The DNN training scheme 400 may further include emotional speech classification, at 412. For example, categorized emotional speech data 424 may be input to the DNN model 144 to generate categorized emotion labels 426 (e.g., anger, boredom, disgust, fear, happiness, sadness, one or more other categorized emotional labels, or a combination thereof). The categorized emotion labels 426 may correspond to nodes of the DNN model 144. For example, the categorized emotion labels 426 may correspond to output nodes of the DNN model 144, such as anger, boredom, disgust, fear, happiness, and sadness output nodes, as illustrative examples. One or more output nodes associated with the categorized emotion labels 426 may correspond to the first characteristic 140 of FIG. 1.

Alternatively or in addition to generating the categorized emotion labels 426, the DNN training scheme 400 may include generating output nodes of the DNN model 144 corresponding to one or more other characteristics. For example, labels may be generated corresponding to age, gender, one or more other classifications, or a combination thereof. The labels may correspond to output nodes of the DNN model 144.

The DNN training scheme 400 may further include determining multiple output nodes associated with multiple corresponding "confidence levels" (or "weights") for one or more labels. To illustrate, for a particular emotion, a first output node of the DNN model 144 may indicate a first confidence level (e.g., 90 percent probability), a second confidence level (e.g., 50 percent probability), and a third confidence level (e.g., 10 percent probability).

Figure 5:
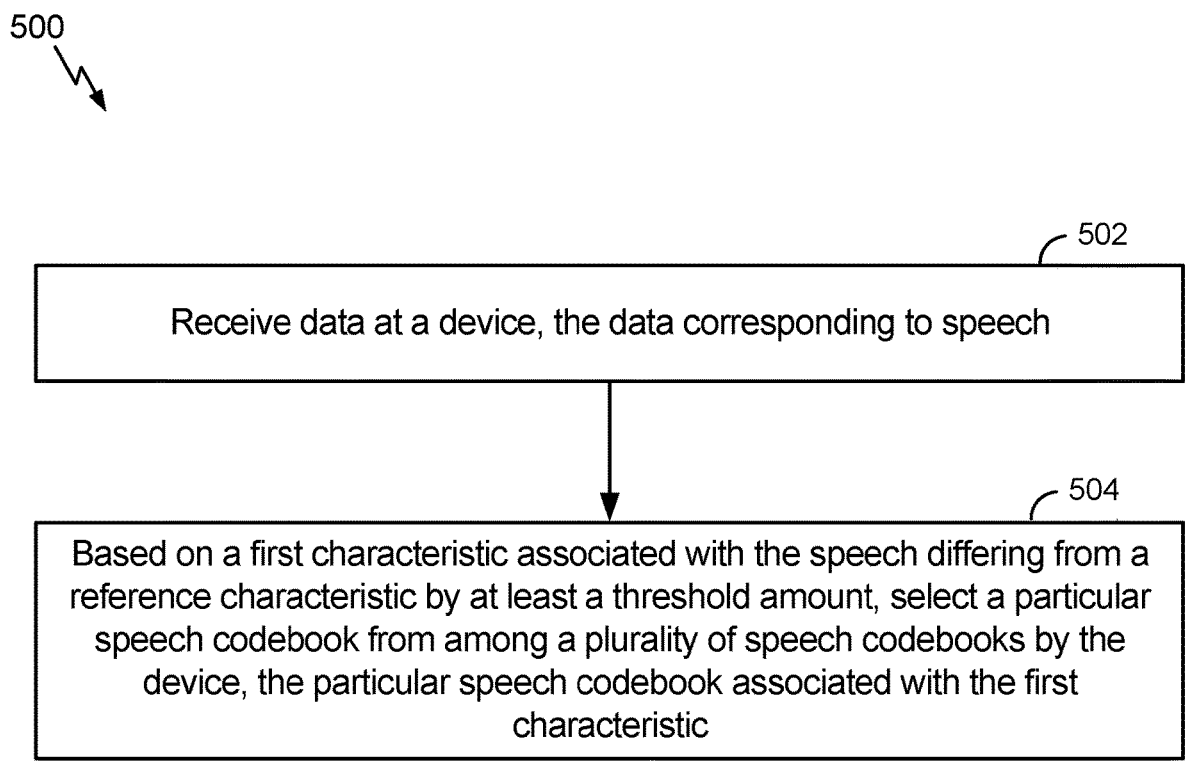
FIG. 5 is a diagram of an illustrative method of operation of the device of FIG. 1.

Referring to FIG. 5, an illustrative example of a method of selecting a speech codebook at a device is depicted and generally designated 500. In an illustrative example, the method 500 is performed at the device 100 of FIG. 1.

The method 500 includes receiving data at the device, the data corresponding to speech, at 502. For example, the speech processing engine 104 may receive the data 102, and the data 102 may correspond to speech.

The method 500 further includes selecting a particular speech codebook from among a plurality of speech codebooks by the device, at 504. The particular speech codebook is selected based on a first characteristic associated with the speech differing from a reference characteristic by at least a threshold amount, and the particular speech codebook is associated with the first characteristic. To illustrate, the selection circuit 106 of FIG. 1 may select the particular speech codebook from the plurality of speech codebooks 108 in response to the first characteristic 140 differing from the reference characteristic 142 by at least a threshold amount.

The method 500 of FIG. 5 may improve operation of a device, such as the device 100 of FIG. 1. For example, use of a particular speech codebook based on a particular speech characteristic may enable "customization" of a particular speech-based operation to compensate for characteristics of the speech (such as by compensating for reduced intelligibility due to emotion, as an illustrative example).

Figure 6:
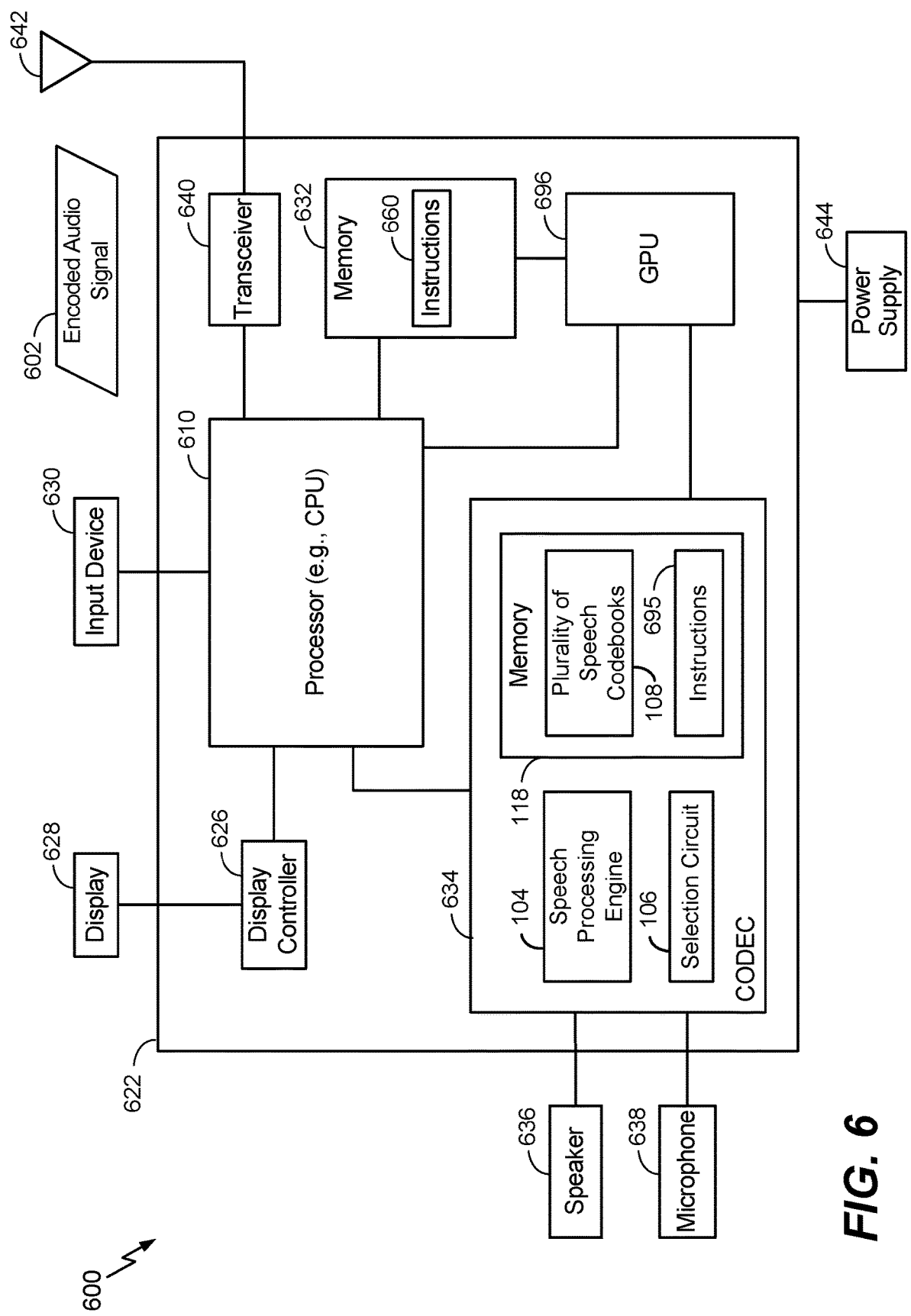
FIG. 6 is a block diagram of an illustrative example of an electronic device that includes the device of FIG. 1.

Referring to FIG. 6, a block diagram of a particular illustrative example of an electronic device is depicted and generally designated 600. In an illustrative example, the electronic device 600 corresponds to a mobile device (e.g., a cellular phone). Alternatively or in addition, one or more aspects of the electronic device 600 may be implemented within a computer (e.g., a server, a laptop computer, a tablet computer, or a desktop computer), an access point, a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 600 includes one or more processors, such as a processor 610 and a graphics processing unit (GPU) 696. The processor 610 may include a central processing unit (CPU), a DSP, another processing device, or a combination thereof.

The electronic device 600 may further include one or more memories, such as a memory 632. The memory 632 may be coupled to the processor 610, to the GPU 696, or to both. The memory 632 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 632 may store instructions 660. The instructions 660 may be executable by the processor 610, by the GPU 696, or by both. The instructions 660 may be executable to perform, initiate, or control one or more operations described with reference to the method 500 of FIG. 5.

A CODEC 634 can also be coupled to the processor 610. The CODEC 634 may be coupled to one or more microphones, such as a microphone 638. The CODEC 634 may include the memory 118. The memory 118 may store instructions 695 executable by the CODEC 634. The memory 118 may store the plurality of speech codebooks 108. In the example of FIG. 6, the CODEC 634 includes the speech processing engine 104 and the selection circuit 106. In other implementations, the speech processing engine 104 and the selection circuit 106 may be external to the CODEC 634.

FIG. 6 also shows a display controller 626 that is coupled to the processor 610 and to a display 628. A speaker 636 may be coupled to the CODEC 634.

The electronic device 600 may further include a transceiver 640 coupled to an antenna 642. The transceiver 640 may be configured to receive an encoded audio signal 602 that is based on the data 102 of FIG. 1. Alternatively or in addition, the transceiver 640 may be configured to transmit the encoded audio signal 602 (e.g., a speech-encoded version of the data 102 generated using a speech codebook selected from the plurality of speech codebooks 108).

In a particular example, the processor 610, the GPU 696, the memory 632, the display controller 626, the CODEC 634, and the transceiver 640 are included in a system-on-chip (SoC) device 622. Further, an input device 630 and a power supply 644 may be coupled to the SoC device 622. Moreover, in a particular example, as illustrated in FIG. 6, the display 628, the input device 630, the speaker 636, the microphone 638, the antenna 642, and the power supply 644 are external to the SoC device 622. However, each of the display 628, the input device 630, the speaker 636, the microphone 638, the antenna 642, and the power supply 644 can be coupled to a component of the SoC device 622, such as to an interface or to a controller.

Figure 7:
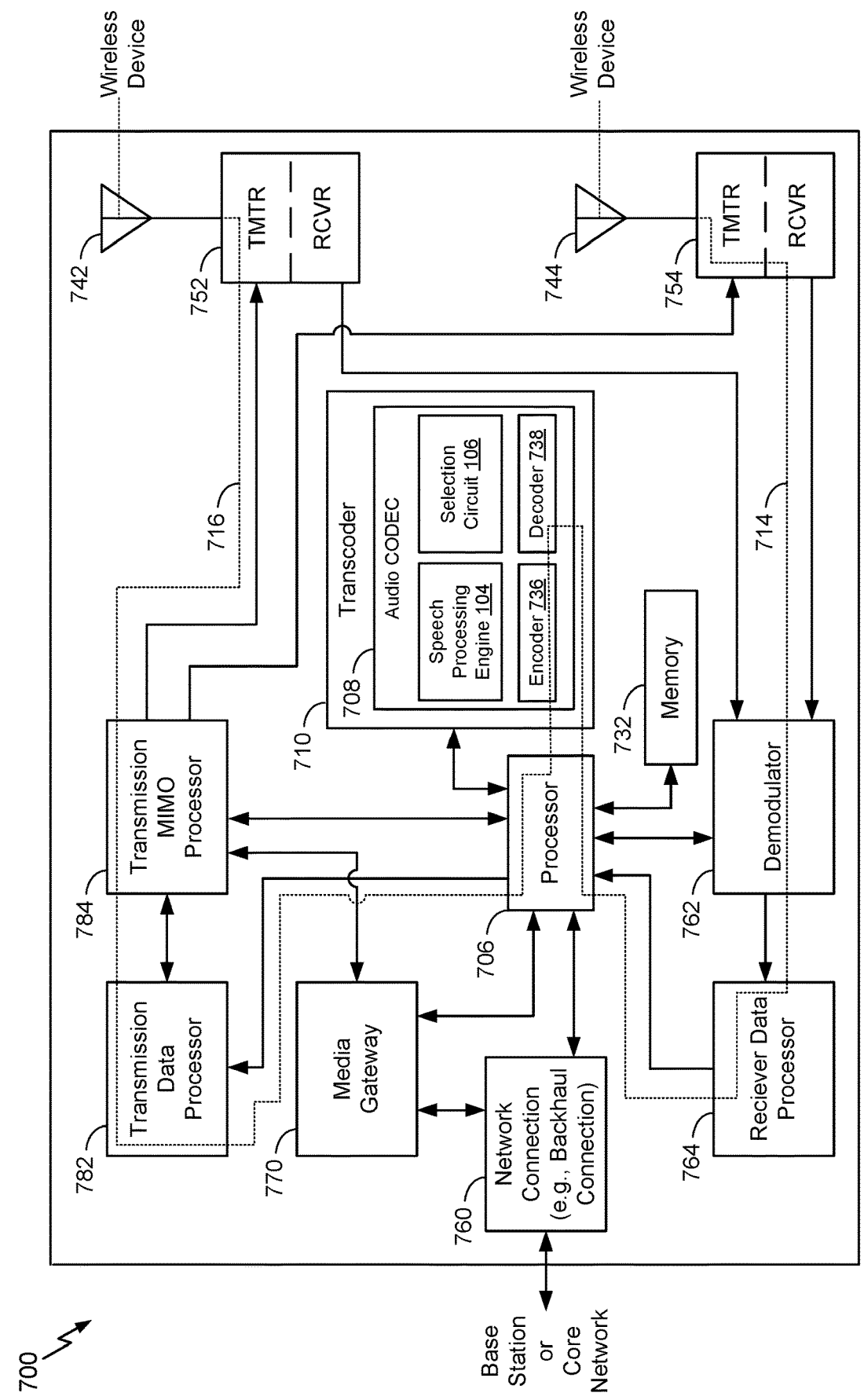
FIG. 7 is a block diagram of an illustrative example of a base station that includes the device of FIG. 1.

Referring to FIG. 7, a block diagram of a particular illustrative example of a base station 700 is depicted. In various implementations, the base station 700 may have more components or fewer components than illustrated in FIG. 7. In an illustrative example, the base station 700 may include the device 100 of FIG. 1. In an illustrative example, the base station 700 may operate according to the method 500 of FIG. 1.

The base station 700 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the electronic device 600 of FIG. 6.

Various functions may be performed by one or more components of the base station 700 (and/or in other components not shown), such as sending and receiving messages and data (e.g., audio data). In a particular example, the base station 700 includes a processor 706 (e.g., a CPU). The base station 700 may include a transcoder 710. The transcoder 710 may include an audio CODEC 708. For example, the transcoder 710 may include one or more components (e.g., circuitry) configured to perform operations of the audio CODEC 708. As another example, the transcoder 710 may be configured to execute one or more computer-readable instructions to perform the operations of the audio CODEC 708. Although the audio CODEC 708 is illustrated as a component of the transcoder 710, in other examples one or more components of the audio CODEC 708 may be included in the processor 706, another processing component, or a combination thereof. For example, a decoder 738 (e.g., a vocoder decoder) may be included in a receiver data processor 764. As another example, an encoder 736 (e.g., a vocoder encoder) may be included in a transmission data processor 782. FIG. 7 also illustrates that the audio CODEC 708 may include the speech processing engine 104 and the selection circuit 106.

The transcoder 710 may be configured to transcode messages and data between two or more networks. The transcoder 710 may be configured to convert message and audio data from a first format (e.g., a digital format) to a second format. To illustrate, the decoder 738 may decode encoded signals having a first format and the encoder 736 may encode the decoded signals into encoded signals having a second format. Additionally or alternatively, the transcoder 710 may be configured to perform data rate adaptation. For example, the transcoder 710 may downconvert a data rate or upconvert the data rate without changing a format of the audio data. To illustrate, the transcoder 710 may downconvert 64 kilobits per second (kbps) signals into 16 kbps signals.

The audio CODEC 708 may include the encoder 736 and the decoder 738. The encoder 736 may include an encoder selector, a speech encoder, and a non-speech encoder. The decoder 738 may include a decoder selector, a speech decoder, and a non-speech decoder.

The base station 700 may include a memory 732. The memory 732, such as a computer-readable storage device, may include instructions. The instructions may include one or more instructions that are executable by the processor 706, the transcoder 710, or a combination thereof, to perform one or more operations of the method 500 of FIG. 5. The base station 700 may include multiple transmitters and receivers (e.g., transceivers), such as a first transceiver 752 and a second transceiver 754, coupled to an array of antennas. The array of antennas may include a first antenna 742 and a second antenna 744. The array of antennas may be configured to wirelessly communicate with one or more wireless devices, such as the electronic device 600 of FIG. 6. For example, the second antenna 744 may receive a data stream 714 (e.g., a bit stream) from a wireless device. The data stream 714 may include messages, data (e.g., encoded speech data), or a combination thereof.

The base station 700 may include a network connection 760, such as backhaul connection. The network connection 760 may be configured to communicate with a core network or one or more base stations of the wireless communication network. For example, the base station 700 may receive a second data stream (e.g., messages or audio data) from a core network via the network connection 760. The base station 700 may process the second data stream to generate messages or audio data and provide the messages or the audio data to one or more wireless device via one or more antennas of the array of antennas or to another base station via the network connection 760. In a particular implementation, the network connection 760 may be a wide area network (WAN) connection, as an illustrative, non-limiting example. In some implementations, the core network may include or correspond to a Public Switched Telephone Network (PSTN), a packet backbone network, or both.

The base station 700 may include a media gateway 770 that is coupled to the network connection 760 and the processor 706. The media gateway 770 may be configured to convert between media streams of different telecommunications technologies. For example, the media gateway 770 may convert between different transmission protocols, different coding schemes, or both. To illustrate, the media gateway 770 may convert from PCM signals to Real-Time Transport Protocol (RTP) signals, as an illustrative, non-limiting example. The media gateway 770 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 770 may include a transcoder, such as the transcoder 710, and may be configured to transcode data when codecs are incompatible. For example, the media gateway 770 may transcode between an Adaptive Multi-Rate (AMR) codec and a G.711 codec, as an illustrative, non-limiting example. The media gateway 770 may include a router and a plurality of physical interfaces. In some implementations, the media gateway 770 may also include a controller (not shown). In a particular implementation, the media gateway controller may be external to the media gateway 770 or to the base station 700. The media gateway controller may control and coordinate operations of multiple media gateways. The media gateway 770 may receive control signals from the media gateway controller and may function to bridge between different transmission technologies and may add service to end-user capabilities and connections.

The base station 700 may include a demodulator 762 that is coupled to the transceivers 752, 754, the receiver data processor 764, and the processor 706. The receiver data processor 764 may be coupled to the processor 706. The demodulator 762 may be configured to demodulate modulated signals received from the transceivers 752, 754 and to provide demodulated data to the receiver data processor 764. The receiver data processor 764 may be configured to extract a message or audio data from the demodulated data and send the message or the audio data to the processor 706.

The base station 700 may include a transmission data processor 782 and a transmission multiple input-multiple output (MIMO) processor 784. The transmission data processor 782 may be coupled to the processor 706 and the transmission MIMO processor 784. The transmission MIMO processor 784 may be coupled to the transceivers 752, 754 and the processor 706. In some implementations, the transmission MIMO processor 784 may be coupled to the media gateway 770. The transmission data processor 782 may be configured to receive the messages or the audio data from the processor 706 and to code the messages or the audio data based on a coding scheme, such as CDMA or orthogonal frequency-division multiplexing (OFDM), as an illustrative, non-limiting examples. The transmission data processor 782 may provide the coded data to the transmission MIMO processor 784.

The coded data may be multiplexed with other data, such as pilot data, using CDMA or OFDM techniques to generate multiplexed data. The multiplexed data may then be modulated (i.e., symbol mapped) by the transmission data processor 782 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 706.

The transmission MIMO processor 784 may be configured to receive the modulation symbols from the transmission data processor 782 and may further process the modulation symbols and may perform beamforming on the data. For example, the transmission MIMO processor 784 may apply beamforming weights to the modulation symbols. The beamforming weights may correspond to one or more antennas of the array of antennas from which the modulation symbols are transmitted.

During operation, the second antenna 744 of the base station 700 may receive a data stream 714. The second transceiver 754 may receive the data stream 714 from the second antenna 744 and may provide the data stream 714 to the demodulator 762. The demodulator 762 may demodulate modulated signals of the data stream 714 and provide demodulated data to the receiver data processor 764. The receiver data processor 764 may extract audio data from the demodulated data and provide the extracted audio data to the processor 706.

The processor 706 may provide the audio data to the transcoder 710 for transcoding. The decoder 738 of the transcoder 710 may decode the audio data from a first format into decoded audio data and the encoder 736 may encode the decoded audio data into a second format. In some implementations, the encoder 736 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 710, the transcoding operations (e.g., decoding and encoding) may be performed by multiple components of the base station 700. For example, decoding may be performed by the receiver data processor 764 and encoding may be performed by the transmission data processor 782. In other implementations, the processor 706 may provide the audio data to the media gateway 770 for conversion to another transmission protocol, coding scheme, or both. The media gateway 770 may provide the converted data to another base station or core network via the network connection 760.

The decoder 738 and the encoder 736 may select a corresponding decoder (e.g., a speech decoder or a non-speech decoder) and a corresponding encoder to transcode (e.g., decode and encode) the frame. The decoder 738 and the encoder 736 may determine, on a frame-by-frame basis, whether each received frame of the data stream 714 corresponds to a narrowband frame or a wideband frame and may select a corresponding decoding output mode (e.g., a narrowband output mode or a wideband output mode) and a corresponding encoding output mode to transcode (e.g., decode and encode) the frame. Encoded audio data generated at the encoder 736, such as transcoded data, may be provided to the transmission data processor 782 or the network connection 760 via the processor 706.

The transcoded audio data from the transcoder 710 may be provided to the transmission data processor 782 for coding according to a modulation scheme, such as OFDM, to generate the modulation symbols. The transmission data processor 782 may provide the modulation symbols to the transmission MIMO processor 784 for further processing and beamforming. The transmission MIMO processor 784 may apply beamforming weights and may provide the modulation symbols to one or more antennas of the array of antennas, such as the first antenna 742 via the first transceiver 752. Thus, the base station 700 may provide a transcoded data stream 716, that corresponds to the data stream 714 received from the wireless device, to another wireless device. The transcoded data stream 716 may have a different encoding format, data rate, or both, than the data stream 714. In other implementations, the transcoded data stream 716 may be provided to the network connection 760 for transmission to another base station or a core network.

In conjunction with the described embodiments, an apparatus includes means (e.g., the speech processing engine 104) for receiving data (e.g., the data 102) corresponding to speech and for determining whether a first characteristic (e.g., the first characteristic 140) associated with the speech differs from a reference characteristic (e.g., the reference characteristic 142) by at least a threshold amount. The apparatus further includes means (e.g., the selection circuit 106) for selecting a particular speech codebook from among a plurality of speech codebooks (e.g., the plurality of speech codebooks 108) based on the first characteristic differing from the reference characteristic by at least the threshold amount. The particular speech codebook is associated with the first characteristic. The apparatus may further include means (e.g., the speech CODEC 124) for encoding the data using the particular speech codebook, for decoding the data using the particular speech codebook, or both.

In conjunction with the described embodiments, a computer-readable medium (e.g., the memory 118, the memory 632, or the memory 732) stores instructions (e.g., the instructions 660 or the instructions 695) executable by a processor (e.g., the processor 610, the GPU 696, a processor of the CODEC 634, the processor 706, or the transcoder 710) to cause the processor to perform operations comprising receiving data (e.g., the data 102) corresponding to speech. The operations further include selecting, based on a first characteristic (e.g., the first characteristic 140) associated with the speech differing from a reference characteristic (e.g., the reference characteristic 142) by at least a threshold amount, a particular speech codebook from among a plurality of speech codebooks (e.g., the plurality of speech codebooks 108). The particular speech codebook is associated with the first characteristic.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, an "engine" (e.g., the speech processing engine 104 of FIG. 1) may include hardware (e.g., circuitry, a processor, or both), processor-executable instructions stored in a computer-readable medium, or a combination thereof. To illustrate, the speech processing engine 104 may include a comparator circuit having a first input configured to receive a first signal indicating the first characteristic 140 and a second input configured to receive a second signal indicating the reference characteristic 142. The comparator circuit may be configured to compare the first characteristic 140 and the reference characteristic 142. The comparator circuit may include an output configured to generate a third signal having one of a first value indicating that the first characteristic 140 differs from the reference characteristic 142 by at least a threshold amount or a second value indicating that the first characteristic 140 does not differ from the reference characteristic 142 by at least a threshold amount. Alternatively or in addition, the speech processing engine 104 may include a processor configured to execute instructions to perform one or more operations described herein, such as by executing a compare instruction to compare the first characteristic 140 and the reference characteristic 142, as an illustrative example.

As used herein, "generating," "calculating," "using," "selecting," "accessing," and "determining" may be used interchangeably. For example, "generating," "calculating," or "determining" a value, a characteristic, a parameter, or a signal may refer to actively generating, calculating, or determining a value, a characteristic, a parameter, or a signal or may refer to using, selecting, or accessing a value, a characteristic, a parameter, or a signal that is already generated, such as by a component or a device.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 600 of FIG. 6.

Although certain examples have been described separately for convenience, it is noted that aspects of such examples may be suitably combined without departing from the scope of the disclosure. For example, the device 100 of FIG. 1 may be configured to operate based on one or more aspects described with reference to FIGS. 2, 3, 4, and 5. Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the method 500 of FIG. 5 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. An apparatus comprising:
a speech processing engine configured to:
  receive data corresponding to speech;
  compare a first characteristic associated with the speech to a reference characteristic associated with normal speech to determine a first parameter, the first characteristic indicating an emotion of a user, or an estimated distance of the user from a microphone; and
  compare the first parameter to a second parameter corresponding to a threshold amount to determine that the first characteristic differs by at least the threshold amount from the reference characteristic associated with normal speech;
a selection circuit responsive to the speech processing engine and configured to select a particular speech codebook from among a plurality of speech codebooks based on the first characteristic differing from the reference characteristic by at least the threshold amount, the particular speech codebook associated with the first characteristic, and the plurality of speech codebooks comprising at least one of a far-field speech codebook, a near-field speech codebook, and an emotion-based codebook; and
a speech coder/decoder (CODEC) configured to encode or decode the data using the particular speech codebook.

2. The apparatus of claim 1, further comprising a memory coupled to the selection circuit, the memory configured to store the plurality of speech codebooks, and wherein the selection circuit is further configured to select a second codebook of the plurality of speech codebooks instead of the particular speech codebook in response to a determination that the first characteristic does not differ from the reference characteristic by at least the threshold amount.

3. The apparatus of claim 1, wherein the speech processing engine is further configured to determine whether a second characteristic associated with the speech differs from the reference characteristic by at least a second threshold amount, and wherein the second characteristic indicates an environment of the user.

4. The apparatus of claim 1, wherein the speech processing engine is further configured to identify the first characteristic using a deep neural network (DNN) model.

5. The apparatus of claim 4, wherein the DNN model is configured to generate a value indicative of the speech.

6. The apparatus of claim 3, wherein the environment corresponds to one or more of a type of building, a particular room of a building, or a vehicle, and wherein the speech processing engine, the selection circuit, and the speech CODEC are integrated into a mobile electronic device.

7. The apparatus of claim 1, wherein the plurality of speech codebooks includes a normal speech codebook.

8. The apparatus of claim 1, further comprising:
an antenna; and
a transceiver coupled to the antenna and configured to receive an encoded audio signal that is based on the data, to transmit the encoded audio signal, or both.

9. The apparatus of claim 8, wherein the speech processing engine, the selection circuit, the transceiver, and the antenna are integrated into a base station.

10. A method of selecting a speech codebook at a device, the method comprising:
receiving data at a device, the data corresponding to speech;
comparing, at the device based on the data, a first characteristic associated with the speech to a reference characteristic associated with normal speech to determine a first parameter, the first characteristic indicating an emotion of a user or an estimated distance of the user from a microphone;
comparing, at the device, the first parameter to a second parameter corresponding to a threshold amount to determine that the first characteristic differs by at least the threshold amount from the reference characteristic associated with normal speech;
selecting, by the device, a particular speech codebook from among a plurality of speech codebooks, the particular speech codebook associated with the first characteristic, and the plurality of speech codebooks comprising at least one of a far-field speech codebook, a near-field speech codebook, and an emotion-based codebook; and
encoding or decoding the data using the particular speech codebook.

11. The method of claim 10, further comprising generating a value indicative of the speech.

12. The method of claim 10, further comprising, based on a second characteristic associated with the speech differing from the reference characteristic by at least a second threshold amount, selecting a second speech codebook from among the plurality of speech codebooks by the device, the second speech codebook associated with an environment of the user, wherein the environment corresponds to one or more of a type of building, a particular room of a building, or a vehicle.

13. The method of claim 10, wherein the first characteristic is identified based on an amount of distortion in the speech.

14. The method of claim 10, wherein the particular speech codebook is associated with a set of values.

15. The method of claim 10, further comprising identifying the first characteristic using a deep neural network (DNN) model.

16. The method of claim 10, further comprising, based on a second characteristic associated with the speech differing from the reference characteristic by at least a second threshold amount, selecting a second speech codebook from among the plurality of speech codebooks by the device.

17. The method of claim 10, further comprising performing one or more of:
a speaker recognition operation to detect a source of the speech; or
a voice recognition operation.

18. The method of claim 10, wherein the selecting includes identifying at least one of a far-field speech codebook, a near-field speech codebook, or an emotion-based speech codebook.

19. The method of claim 10, wherein the particular speech codebook is selected in response to at least one value indicated by the first characteristic corresponding to the particular speech codebook.

20. The method of claim 10, wherein the receiving, the selecting, and the encoding or decoding are performed within a device that comprises a mobile electronic device.

21. An apparatus comprising:
means for receiving data corresponding to speech, for comparing a first characteristic associated with the speech to a reference characteristic associated with normal speech to determine a first parameter, the first characteristic indicating an emotion of a user or an estimated distance of the user from a microphone, and for comparing the first parameter to a second parameter corresponding to a threshold amount to determine that the first characteristic differs by at least the threshold amount from the reference characteristic associated with normal speech;
means for selecting a particular speech codebook from among a plurality of speech codebooks based on the first characteristic differing from the reference characteristic by at least the threshold amount, the particular speech codebook associated with the first characteristic, and the plurality of speech codebooks comprising at least one of a far-field speech codebook, a near-field speech codebook, and an emotion-based codebook; and
means for encoding or decoding the data using the particular speech codebook.

22. The apparatus of claim 21, further comprising means for storing the plurality of speech codebooks.

23. The apparatus of claim 21, wherein the means for receiving is configured to determine whether a second characteristic associated with the speech differs from the reference characteristic by at least a second threshold amount, the second characteristic indicating an environment of the user.

24. The apparatus of claim 21, further comprising a deep neural network (DNN) model configured to generate a value indicative of the speech.

25. The apparatus of claim 21, wherein the means for receiving, the means for selecting, and the means for encoding or decoding are integrated into a mobile electronic device.

26. A computer-readable medium storing instructions that, when executed by a processor, cause the processor to initiate or perform operations comprising:
receiving data corresponding to speech;
comparing, based on the data, a first characteristic associated with the speech to a reference characteristic associated with normal speech to determine a first parameter, the first characteristic indicating an emotion of a user or an estimated distance of the user from a microphone;

comparing the first parameter to a second parameter corresponding to a threshold amount to determine that the first characteristic differs by at least the threshold amount from the reference characteristic associated with normal speech;

based on the first characteristic associated with the speech differing from the reference characteristic by at least the threshold amount, selecting a particular speech codebook from among a plurality of speech codebooks, the particular speech codebook associated with the first characteristic, and the plurality of speech codebooks comprising at least one of a far-field speech codebook, a near-field speech codebook, and an emotion-based codebook; and encoding or decoding the data based on the particular speech codebook.

27. The computer-readable medium of claim 26, wherein the operations include generating a value indicative of the speech.

28. The computer-readable medium of claim 26, wherein the plurality of speech codebooks comprises includes at least one of a far field speech codebook, a near field speech codebook, an emotion based speech codebook, or a normal speech codebook.

29. The computer-readable medium of claim 26, wherein the operations further comprise identifying the first characteristic using a deep neural network (DNN) model.

30. The computer-readable medium of claim 26, wherein the operations include, based on a second characteristic associated with the speech differing from the reference characteristic by at least a second threshold amount, selecting a second speech codebook from among the plurality of speech codebooks, the particular speech codebook associated with the second characteristic, and the second characteristic indicative of an environment of the user.

* * * * *